United States Patent
Lee et al.

(10) Patent No.: US 7,783,192 B2
(45) Date of Patent: Aug. 24, 2010

(54) PICTURE IMAGE PROVIDING METHOD AND PICTURE-TAKING DEVICE USING THE METHOD

(75) Inventors: Jin Wook Lee, Yongin-si (KR); Su Myeon Kim, Yongin-si (KR); Hun Lim, Yongin-si (KR); Won Keun Kong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 784 days.

(21) Appl. No.: 11/712,432

(22) Filed: Mar. 1, 2007

(65) Prior Publication Data

US 2008/0095527 A1    Apr. 24, 2008

(30) Foreign Application Priority Data

Oct. 18, 2006    (KR) ............... 10-2006-0101362

(51) Int. Cl.
*G03B 19/00* (2006.01)
*G03B 17/00* (2006.01)
*H04N 7/00* (2006.01)
*H04N 11/00* (2006.01)

(52) U.S. Cl. ................. 396/429; 396/56; 348/552

(58) Field of Classification Search .......... 396/429, 396/56, 57; 348/208.12, 552; 455/422.1, 455/425, 556.1, 556.2
See application file for complete search history.

(56) References Cited

U.S. PATENT DOCUMENTS 5,737,491 A    4/1998    Allen et al.

2002/0069237 A1    6/2002    Ehara
2004/0208372 A1*   10/2004    Boncyk et al. ............ 382/181

FOREIGN PATENT DOCUMENTS

| JP | 2002-010188 A | 1/2002 |
|---|---|---|
| KR | 10-2002-0019206 A | 3/2002 |
| KR | 10-2004-0099047 A | 11/2004 |
| KR | 10-2004-0100175 A | 12/2004 |
| KR | 10-2005-0011277 A | 1/2005 |
| KR | 10-2005-0049289 A | 5/2005 |

* cited by examiner

*Primary Examiner*—Rochelle-Ann J Blackman
(74) *Attorney, Agent, or Firm*—Sughrue Mion, PLLC (57) ABSTRACT

A picture image providing method and a picture-taking device using the method are provided. The picture-taking device includes: a picture-taking module generating a picture image by taking a picture of a photography object via a camera; a transmission location management module managing a target image for identifying the photography object included in the picture image, and transmission location information for transmitting the picture image, in correspondence to the target image; an area selection module selecting an area on the picture image corresponding to the target image; an image identification module identifying the target image corresponding to the photography object, included in the picture image, using the target image and the selected area on the picture image; and a picture image transmission module identifying the transmission location information corresponding to the identified target image, and transmitting the picture image to a location corresponding to the transmission location information.

9 Claims, 6 Drawing Sheets

PICTURE IMAGE PROVIDING METHOD AND PICTURE-TAKING DEVICE USING THE METHOD

CROSS-REFERENCE TO RELATED APPLICATION

This application claims priority from Korean Patent Application No. 10-2006-0101362, filed on Oct. 18, 2006, in the Korean Intellectual Property Office, the entire disclosure of which is incorporated herein by reference.

BACKGROUND OF THE INVENTION

1. Field of the Invention

Methods consistent with the present invention relate to providing a picture image. More particularly, the present invention relates to a picture image providing method which identifies an object of photography (photography object) in the picture image, generated via a camera, and transmits the picture image to a mobile device or a storage space, corresponding to the identified photography object, and a picture-taking device using the method.

2. Description of Related Art

As many people carry mobile devices, e.g., a digital camera and a cellular phone having a camera, due to a development of a digital technology, people are able to take a picture of an object of photography (hereinafter, photography object) that they want regardless of time and location.

However, a great amount of time and efforts are required to manage the picture images, e.g., photos, that are taken using the mobile device. Due to a difficulty in the management of the picture image, a problem often occurs in that the picture images become pointless. Particularly, the most difficult problem is that when the picture images are taken via a camera of the picture-taker, and when a user corresponding to the photography object wants to acquire the picture image, the user is required to acquire the picture image from the picture-taker.

In a conventional art, when the picture-taker wants to provide the user corresponding to the photography object with the picture image, the picture image is transmitted to an e-mail address of the user by connecting the camera with the mobile device using a universal serial bus (USB) and then downloading the picture image from the camera, or the picture image is transmitted to the user by copying the picture image into a secondary memory unit, such as a CDROM. Also, the user can acquire the picture image by uploading the picture image from a webpage of the picture-taker. However, the picture-taker is required to perform complex procedures in order to provide the picture image, and the user can not acquire the picture image when the picture-taker does not transmit the picture image.

SUMMARY OF THE INVENTION

The present invention provides a picture image providing method and a picture-taking device using the method which enables a picture-taker to more conveniently provide a user, corresponding to a photography object, with a picture image since a picture of the photography object is taken in the picture-taking device, and the picture image is transmitted to a mobile device or a storage device, corresponding to the photography object on a generated picture image, after taking the picture.

The present invention also provides a picture image providing method and a picture-taking device using the method which can receive transmission location information corresponding to a mobile device for transmitting the picture image and a target image for identifying a photography object on the picture image, from a mobile device, by detecting the mobile device within a predetermined distance.

The present invention also provides a picture image providing method and a picture-taking device using the method which can more conveniently provide a user with a picture image having a user's image since the picture image, generated in the picture-taking device, is provided to a storage device corresponding to a photography object on the picture image, such as an e-mail address, and a blog address.

According to an aspect of the present invention, there is provided a picture-taking device including: a picture-taking module generating a picture image by taking a picture of a photography object via a camera; a transmission location management module managing a target image for identifying the photography object included in the picture image, and transmission location information for transmitting the picture image, in correspondence to the target image; an area selection module selecting an area on the picture image corresponding to the target image; an image identification module identifying the target image corresponding to the photography object, included in the picture image, using the target image and the selected area on the picture image; and a picture image transmission module identifying the transmission location information corresponding to the identified target image, and transmitting the picture image to a location corresponding to the transmission location information.

In this case, the picture-taking device detects a mobile device within a predetermined distance, and receives the transmission location information corresponding to the mobile device, and the target image corresponding to a user of the mobile device, from the detected mobile device.

In this case, the transmission location information includes at least one of an Internet Protocol (IP) address, an e-mail address, and a blog address, corresponding to a storage device.

According to another aspect of the present invention, there is provided a picture image providing method including: generating a picture image by taking a picture of a photography object via a camera; managing a target image for identifying the photography object included in the picture image, and transmission location information for transmitting the picture image, in correspondence to the target image; selecting an area on the picture image corresponding to the target image; identifying, using the target image and the selected area on the picture image, the target image corresponding to the photography object included in the picture image; and identifying the transmission location information corresponding to the identified target image, and transmitting the picture image to a location corresponding to the transmission location information.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
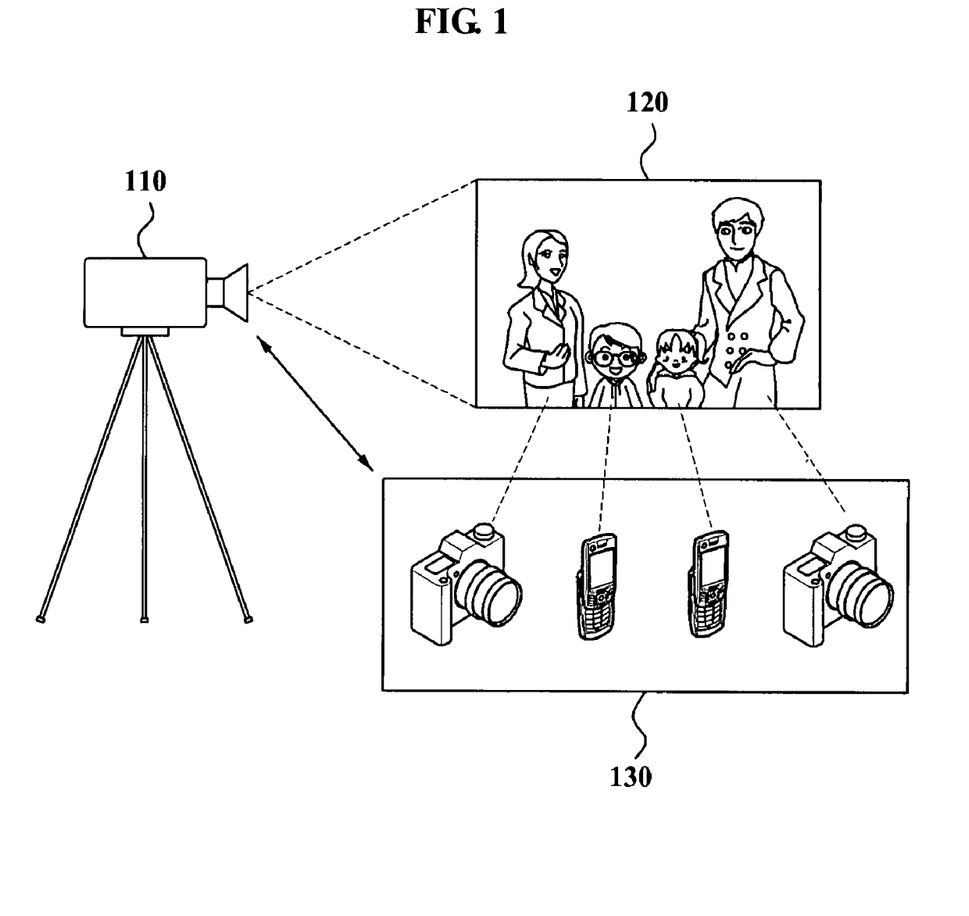
FIG. 1 is a diagram illustrating a network connection including a picture-taking device according to an exemplary embodiment of the present invention.

FIG. 1 is a diagram illustrating a network connection including a picture-taking device 110 according to an exemplary embodiment of the present invention.

Referring to FIG. 1, the picture-taking device 110 generates a picture image by taking a picture of a photography object 120 via a camera, and selects an area on the generated picture image.

In this case, the selected area on the picture image is selected according to a target image that is used for identifying the photography object included in the picture image. The picture-taking device 110 identifies the selected image as the target image corresponding to the photography object included in the picture image using the target image. In this case, the target image may be received with transmission location information from a mobile device 130 within a predetermined distance, or may be received from a remote location. The picture image is transmitted by referring to the transmission location information corresponding to the identified target image. In this case, the transmission location information may include one of a near field communication (NFC) device identifier, an IP address, an e-mail address, and a blog address, corresponding to a storage device.

Figure 2:
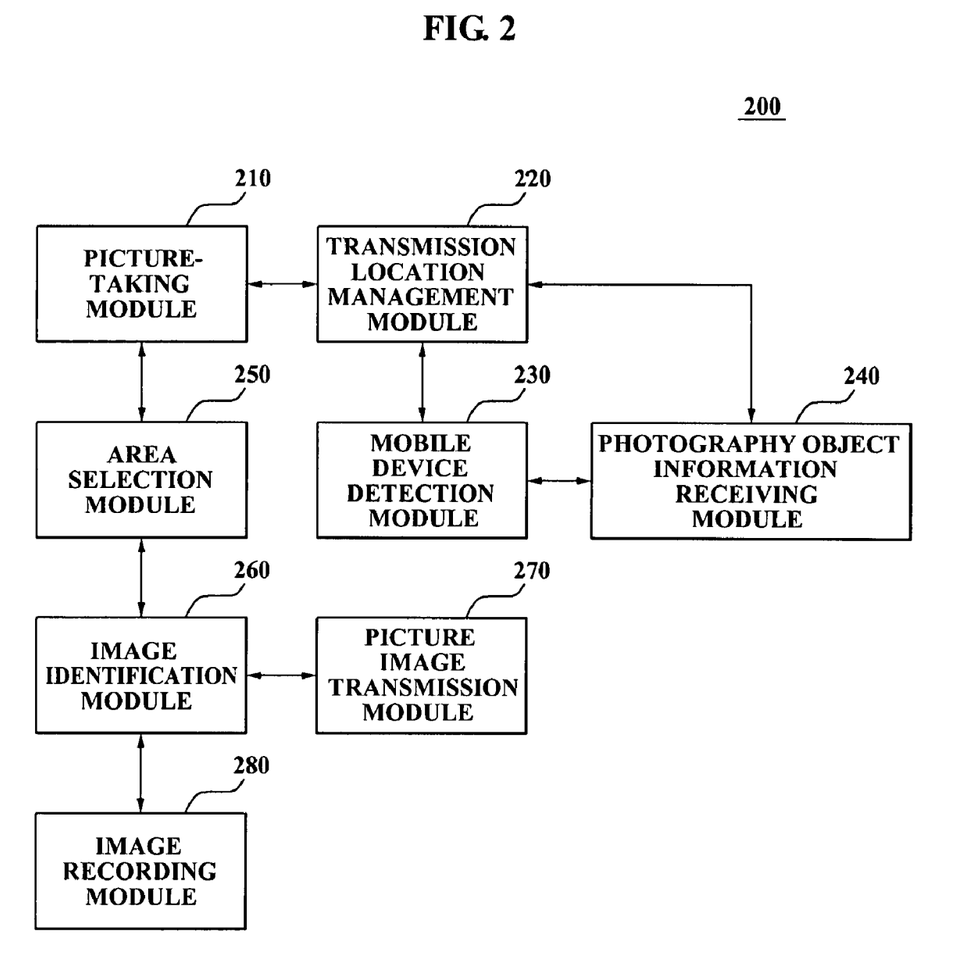
FIG. 2 is a block diagram illustrating a configuration of a picture-taking device according to an exemplary embodiment of the present invention.

FIG. 2 is a block diagram illustrating a configuration of a picture-taking device 200 according to an exemplary embodiment of the present invention.

The picture-taking device 200 of FIG. 2 includes a picture-taking module 210, a transmission location management module 220, a mobile device detection module 230, a photography object information receiving module 240, an area selection module 250, an image identification module 260, a picture image transmission module 270, and an image recording module 280.

The picture-taking module 210 generates a picture image by taking a picture of a photography object via a camera. As an example, the camera of the picture-taking module 210 may include image sensors, such as a charge coupled device (CCD) or a complementary metal-oxide semiconductor (CMOS).

Figure 3:
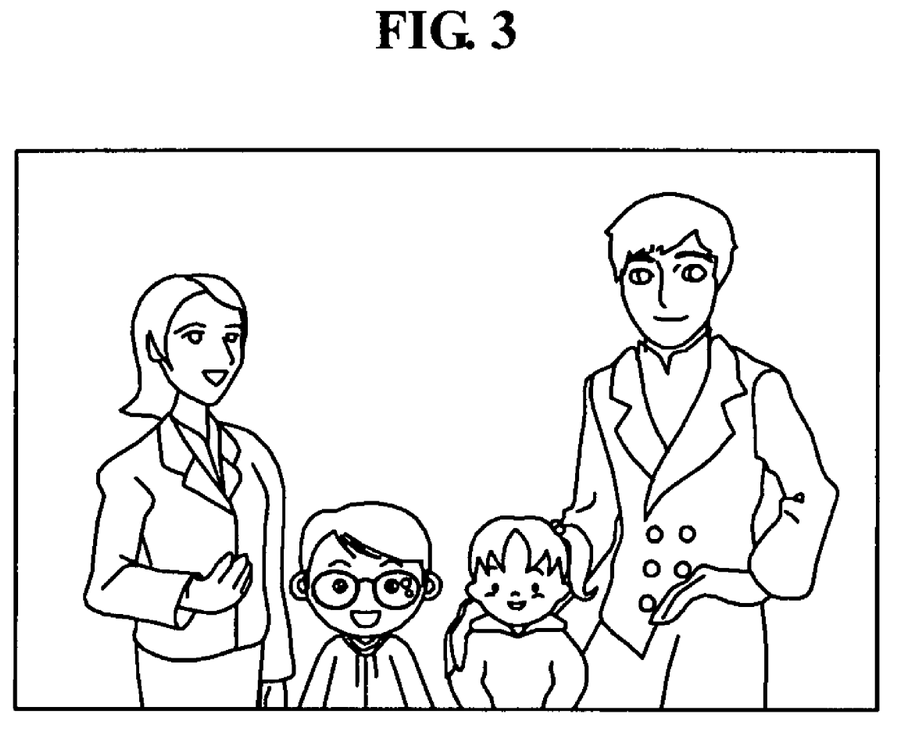
FIG. 3 is a diagram illustrating an example of a picture image, generated by taking a picture of a photography object according to an exemplary embodiment of the present invention.

FIG. 3 is a diagram illustrating an example of a picture image, generated by taking a picture of a photography object of the present invention.

Referring to FIGS. 2 and 3, a picture-taker may take a picture of family members, including a father, a mother, a brother, and a sister, using the picture-taking device 200. The picture-taking module 210 in the picture-taking device 200 generates a picture image corresponding to the family members, i.e., the picture image of the photography object which is taken via the camera.

The transmission location management module 220 manages a target image for identifying the photography object included in the picture image, and transmission location information for transmitting the picture image in corresponding to the target image. As an example, the target image is used to identify the photography object included in the picture image, and may include images of a face or an object, corresponding to the photography object. As an example, the transmission location management module 220 may manage the transmission location information and the target image, stored in a predetermined storage device, and may transmit/receive the target image and the transmission location information, stored in a remote location.

As another example, the transmission location management module 220 may receive the transmission location information and the target image from an external storage device corresponding to the photography object, connected to a predetermined communication module. In this case, the predetermined communication module may use short range wireless communication technologies, e.g., an NFC, a radio frequency identification (RFID), and the like. Also, the transmission location information may include at least one of an NFC device identifier, an IP address, an e-mail address, and a blog address, corresponding to a storage device.

The mobile device detection module 230 detects a mobile device within a predetermined distance, the photography object information receiving module 240 receives the target image corresponding to a user of the mobile device and the transmission location information corresponding to the mobile device, from the detected mobile device. In this case, the mobile device detection module 230 may detect the mobile device before taking a picture of the photography object, and may detect the mobile device after taking the picture of the photography object, via the camera.

The area selection module 250 selects an area on the picture image.

Figure 4:
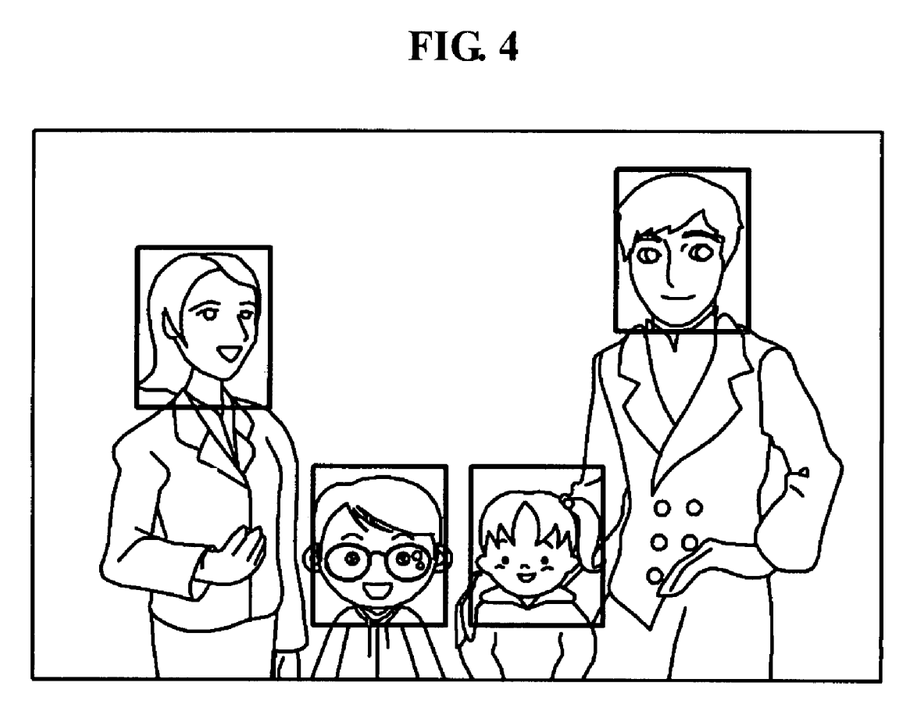
FIG. 4 is a diagram illustrating an example of a selected area on a picture image according to an exemplary embodiment of the present invention.

FIG. 4 is a diagram illustrating an example of a selected area on a picture image of the present invention.

Referring to FIGS. 2 and 4, the area selection module 250 may select an area on a picture image for identifying a photography object included in the picture image. Specifically, the area selection module 250 may respectively select facial areas with respect to a father, a mother, a brother, and a sister on the picture image when the photography object included in the picture image, is family members including the father, the mother, the brother, and the sister.

The image identification module 260 identifies the selected areas using target images corresponding to the photography objects included in the picture image using the target image.

As an example, the image identification module 260 identifies, using a face-recognition technology, selected area as an identified target image using the target image corresponding to the photography object included in the picture image. The face-recognition technology may recognize the photography object included in the picture image by extracting facial areas with respect to the photography object on the picture image, and comparing the extracted face portion with the target image.

As another example, the image identification module 260 may compare the selected area with the target image corresponding to the photography object including in the picture image, and identify, using the face recognition technology, the selected area as the identified target area using the target image corresponding to the photography object included in the picture image. The selected area would be identified when a similarity between the selected area and the target image is greater than a predetermined level.

Figure 5:
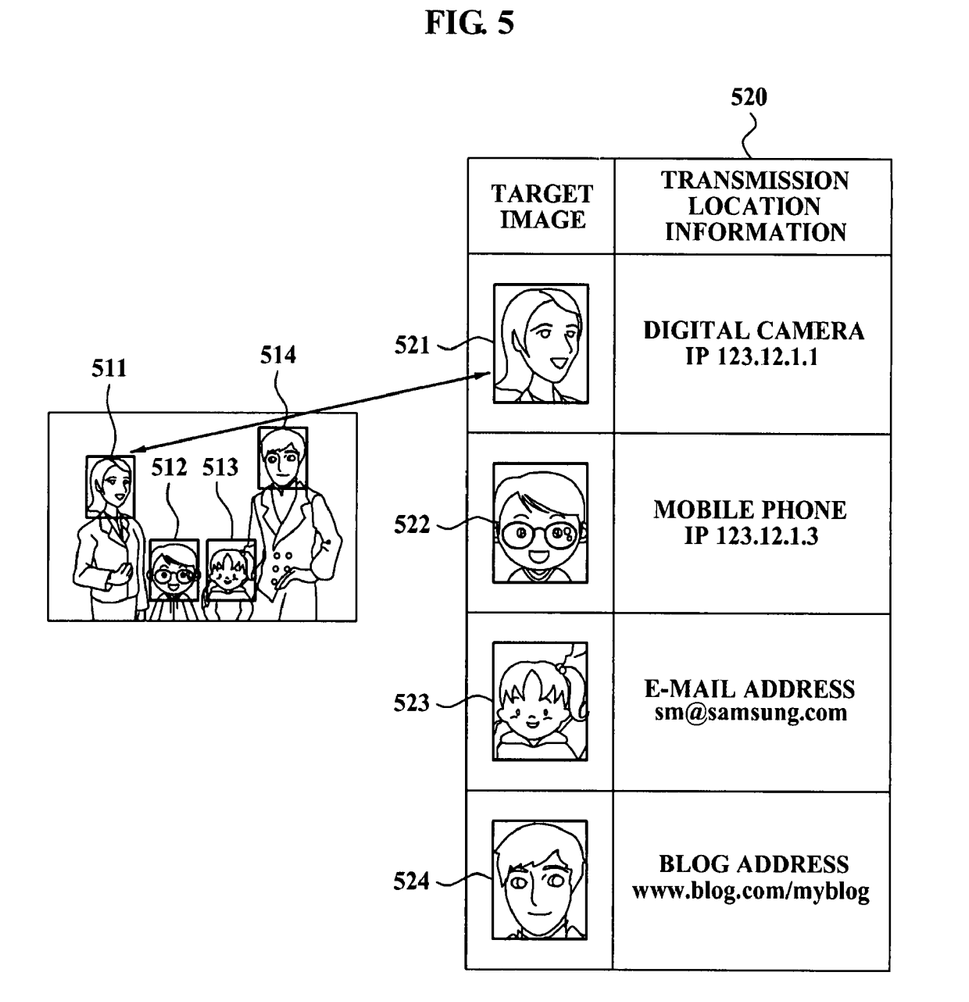
FIG. 5 is a diagram illustrating an example of identifying a target image corresponding to a photography object, included in a picture image according to an exemplary embodiment of the present invention.

FIG. 5 is a diagram illustrating an example of identifying a target image corresponding to a photography object included in a picture image of the present invention.

Referring to FIGS. 2 and 5, the image identification module 260 may compare selected areas 511, 512, 513, and 514 on the picture image with the target images 521, 522, 523, and 524. In this case, the image identification module 260 may compare the selected areas 511, 512, 513, and 514 with the target image 521 and then identify the selected area 511 as an identified target image using the target image corresponding to the photography object included in the picture image when a similarity between the selected area 511 and the target image 521 is greater than a predetermined level. Later, the image identification module 260 may compare the selected areas 511, 512, 513 and 514 on the picture image with the remaining target images 522, 523, and 524 and identify the selected areas 511, 512, 513 and 514 on the picture image using the target images corresponding to the photography objects included in the picture image. In this case, the target image may be a face image, corresponding to the photography object, or may be a particular item, e.g., glasses or a necktie, corresponding to the photography object.

The picture image transmission module 270 identifies the transmission location information corresponding to the identified target image, and transmits the picture image to a location corresponding to the identified transmission location information. In this case, the picture image transmission module 270 may transmit the picture image via a predetermined communication module. The predetermined communication module may include wireless communication modules, e.g. a Bluetooth module, a Zigbee module, an ultra wideband (UWB) module, a wireless universal serial bus (USB) module, or an Infrared Data Association (IrDA) module, and the like. Also, the communication modules may include wired communication modules, e.g. an Ethernet module, a USB module, an Institute of Electrical and Electronics Engineers (IEEE) 1394 module, and the like. Namely, according to the present invention, the picture image may be transmitted to a mobile device, which is owned by the photography object included in the identified target image. Also, the picture image may be transmitted to at least one of a storage device corresponding to the photography object, included in the identified target image, such as an e-mail address, and a blog address.

As an example, the picture image transmission module 270 may acquire the transmission location information corresponding to the identified target image via a web search, and transmit the picture image by referring to the acquired transmission location information. Namely, the transmission location information such as the e-mail address and the blog address, corresponding to the identified target image, may be acquired via the web search, and the picture image may be transmitted by referring to the acquired transmission location information.

The image recording module 280 stores the picture image in an external storage device when the target image corresponding to the photography object included in the picture image, is not found, as a result of the identification of the image identification module 260.

Figure 6:
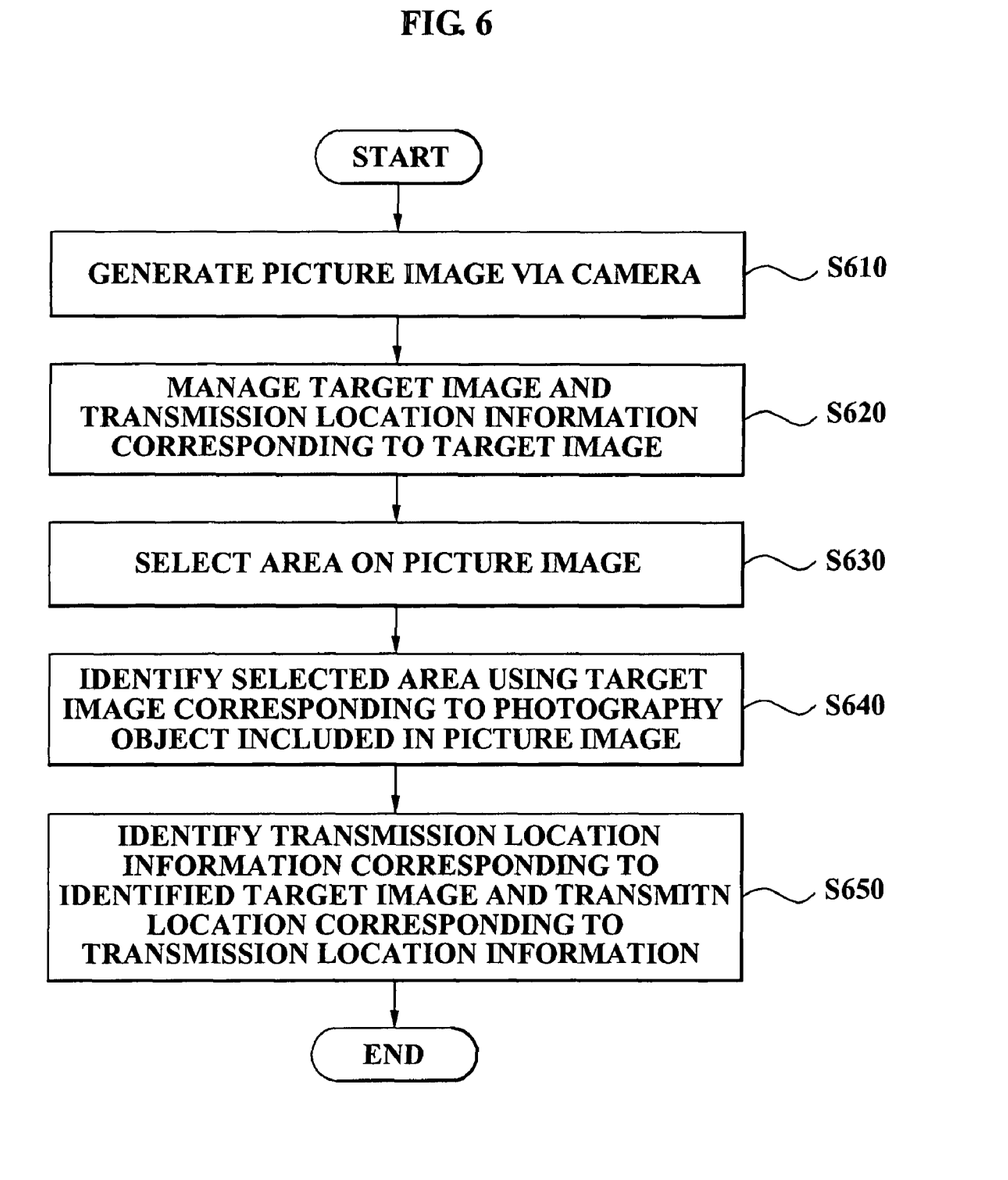
FIG. 6 is a flowchart illustrating a picture image providing method according to an exemplary embodiment of the present invention.

FIG. 6 is a flowchart illustrating a picture image providing method according to an exemplary embodiment of the present invention.

Referring to FIG. 6, the picture image providing method generates a picture image by taking a picture of a photography object via a camera in operation S610.

Also, the picture image providing method manages a target image that is used for identifying the photography object included in the picture image, and transmission location information corresponding to the target image in operation S620.

The target image that is used for identifying the photography object included in the picture image may include images of a face or an object, which corresponds to the photography object. As an example, the picture image providing method may manage the transmission location information and the target image, stored in a predetermined storage device, and may transmit/receive the transmission location information and the target image, stored in a remote location.

As another example, the picture image providing method may receive the transmission location information and the target image from an external storage device corresponding to the photography object, connected to a predetermined communication module. In this case, the predetermined communication module may use short range wireless communication technologies, e.g. an NFC and an RFID, among others. Also, the transmission location information may include at least one of an NFC device identifier, an IP address, an e-mail address, and a blog address, corresponding to the storage device.

According to the embodiment of the present invention, the transmission location information detects a mobile device within a predetermined distance, and receives the transmission location information corresponding to the mobile device and the target image corresponding to a user of the mobile device, from the detected mobile device. In this case, the picture image providing method may detect the mobile device before or after taking a picture of the photography object, via the camera.

Also, the picture image providing method selects an area on the picture image in correspondence to the target image in operation S630.

Also, the picture image providing method identifies the selected area using the target image corresponding to the photography object included in the picture image in operation S640. As an example, the picture image providing method identifies, using a face-recognition technology, the selected area using the target image corresponding to the photography object included in the picture image, as an identified target image. The face-recognition technology may recognize the photography object included in the picture image by extracting a facial area with respect to the photography object on the picture image, and comparing the extracted face portion with the target image.

As another example, the picture image providing method may compare the selected area with the target image and identify, using the face-recognition, the selected area as an identified target image using the target image when a similarity between the selected area and the target image is greater than a predetermined level.

Also, the picture image providing method may identify the transmission location information corresponding to the identified target image, and transmit the picture image to a location corresponding to the identified transmission location information in operation S650. In this case, the picture image providing method may transmit the picture image via a predetermined communication module. The predetermined communication module may include wireless communication modules, e.g. a Bluetooth module, a Zigbee module, a UWB module, a USB module, and an IrDA module, among others. Also, the communication modules may include wired communication modules, e.g. an Ethernet module, a USB module, and an IEEE 1394 module, among others. As an example, the picture image may be transmitted to a mobile device, which is owned by the photography object corresponding to the identified target image. Also, the picture image may be transmitted to at least one of a storage device corresponding to the photography object included in the identified target image, such as an e-mail address, and a blog address, among others.

As another example, the picture image providing method may acquire the transmission location information corresponding to the identified target image via a web search, and transmit the picture image by referring to the acquired transmission location information. Namely, the transmission location information corresponding to the identified target image, such as the e-mail address and the blog address, may be acquired via the web search, and the picture image may be transmitted by referring to the acquired transmission location information.

According to the embodiment of the present invention, the picture image providing method stores the picture image in an external storage device when the target image corresponding to the photography object, included in the picture image, is not found, as a result of the identification of the image identification module.

Hereto, the picture providing method according to the present invention has been described, a detailed description regarding the picture providing method will be omitted since the aforementioned descriptions from FIGS. 1 through 5 can be applied to the embodiment.

The picture image providing method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, there are provided a picture image providing method and a picture-taking device using the method which enables a picture-taker to more conveniently provide a user, corresponding to a photography object, with a picture image since a picture of the photography object is taken in the picture-taking device, and the picture image is transmitted to a mobile device or a storage device, corresponding to the photography object on a generated picture image, after taking the picture.

Also, according to the present invention, there are provided a picture image providing method and a picture-taking device using the method which can receive transmission location information corresponding to a mobile device for transmitting the picture image and a target image for identifying a photography object on the picture image, from a mobile device, by detecting the mobile device within a predetermined distance.

Also, according to the present invention, there are provided a picture image providing method and a picture-taking device using the method which can more conveniently provide a user with a picture image having a user's image since the picture image, generated in the picture-taking device, is provided to a storage device corresponding to a photography object on the picture image, such as an e-mail address, and a blog address.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A picture-taking device, comprising:
   a mobile device detection module which detects a mobile device within a predetermined distance;
   a photography object information receiving module which receives transmission location information corresponding to the mobile device and a target image corresponding to a user of the mobile device, from the detected mobile device;
   a picture-taking module which takes a picture of a photography object through a camera and generates a picture image from the taken picture;
   a transmission location management module which manages a target image for identifying the photography object in the picture image, and transmission location information for transmitting the picture image, corresponding to the target image;
   an area selection module which selects an area on the picture image;
   an image identification module which identifies the selected area on the picture image as an identified target image, using the target image corresponding to the photography object in the picture image; and
   a picture image transmission module which identifies the transmission location information corresponding to the identified target image, and transmits the picture image to a location corresponding to the transmission location information.

2. The picture-taking device of claim 1, wherein the image identification module identifies the selected area using the target image corresponding to the photography object in the picture image, by using a face-recognition technology.

3. The picture-taking device of claim 2, wherein the image identification module compares the selected area with the target image corresponding to the photography object in the picture image and identifies the selected area as the identified target image if a similarity between the selected area and the target image is greater than a predetermined level, by using the face-recognition technology.

4. The picture-taking device of claim 1, further comprising:
   an image recording module which stores the picture image in an external storage device if the target image corresponding to the photography object in the picture image, is not found, as a result of the identification.

5. A picture image providing method, comprising:
   detecting a mobile device within a predetermined distance;

receiving transmission location information corresponding to the mobile device and a target image corresponding to a user of the mobile device, from the detected mobile device;
taking a picture of a photography object through a camera;
generating a picture image from the taken picture;
managing a target image for identifying the photography object included in the picture image, and transmission location information for transmitting the picture image, in accordance with the target image;
selecting an area on the picture image;
identifying the selected area on the picture image using the target image corresponding to the photography object included in the picture image, as identified target image; and
identifying transmission location information corresponding to the identified target image, and transmitting the picture image to a location corresponding to the transmission location information corresponding to the identified target image.

6. The picture image providing method of claim 5, wherein the identifying the selected area identifies the selected area as the target image corresponding to the photography object included in the picture image, using a face-recognition technology.

7. The picture image providing method of claim 6, wherein the identifying the selected area compares the selected image with the target image and identifies the selected area as the target image if a similarity between selected area and the target image is greater than a predetermined level.

8. The picture image providing method of claim 5, further comprising:
storing the picture image in an external storage device if the target image corresponding to the photography object in the picture image, is not found.

9. A computer-readable storage medium storing a program for implementing a picture image providing method, the method comprising:
detecting a mobile device within a predetermined distance;
receiving transmission location information corresponding to the mobile device and a target image corresponding to a user of the mobile device, from the detected mobile device;
taking a picture of a photography object through a camera;
generating a picture image from the taken picture;
managing a target image for identifying the photography object in the picture image, and
transmission location information for transmitting the picture image, corresponding to the target image;
selecting an area on the picture image;
identifying the selected area on the picture image using the target image corresponding to the photography object in the picture image, as identified target image; and
identifying transmission location information corresponding to the identified target image, and transmitting the picture image to a location corresponding to the transmission location information.

* * * * *